United States Patent
Brenner et al.

(10) Patent No.: US 11,589,111 B2
(45) Date of Patent: *Feb. 21, 2023

(54) SYSTEM AND METHOD FOR PROVIDING VIDEO PROGRAM INFORMATION OR VIDEO PROGRAM CONTENT TO A USER

(75) Inventors: Scott Brenner, Superior, CO (US); Michael E. Cain, Arvada, CO (US); Kenneth L. Hamel, Louisville, CO (US); Joshua D. Staller, Littleton, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 187 days.

This patent is subject to a terminal disclaimer.

(21) Appl. No.: 13/446,479

(22) Filed: Apr. 13, 2012

(65) Prior Publication Data

US 2012/0204214 A1   Aug. 9, 2012

Related U.S. Application Data

(63) Continuation of application No. 10/074,743, filed on Feb. 12, 2002, now Pat. No. 8,181,215.

(51) Int. Cl.
*H04N 7/173* (2011.01)
*H04N 21/442* (2011.01)
(Continued)

(52) U.S. Cl.
CPC ......... *H04N 21/44204* (2013.01); *H04N 5/76* (2013.01); *H04N 7/17318* (2013.01);
(Continued)

(58) Field of Classification Search
CPC ......... H04N 21/47202; H04N 7/17318; H04N 7/17336; H04N 21/44204; H04N 5/76;
(Continued)

(56) References Cited

U.S. PATENT DOCUMENTS

| | | | |
|---|---|---|---|
| 3,886,302 A | | 5/1975 | Kosco |
| 4,918,831 A | * | 4/1990 | Kliman ............... H02K 19/103 228/49.1 |

(Continued)

FOREIGN PATENT DOCUMENTS

| | | |
|---|---|---|
| CA | 2472921 | 7/2004 |
| EP | 0 757 487 A1 | 2/1997 |

(Continued)

OTHER PUBLICATIONS

Canadian Patent Application No. 2,472,921 Office Action dated Nov. 25, 2009.

(Continued)

*Primary Examiner* — Annan Q Shang
(74) *Attorney, Agent, or Firm* — Banner & Witcoff, Ltd.

(57) ABSTRACT

In a system for broadcasting video programs to a user including a display, a system and method for providing program information or a copy of at least a portion of a program to the user. In one embodiment, a controller receives an input signal representing a request for summary information concerning a program, the program having a beginning and the input signal generated at a time during the broadcast. The controller provides via the display a summary of the program from the program beginning to the input signal time in response to the input signal. A controller may alternatively monitor a period of time during which the display is tuned to a broadcast of a program, the period starting during the broadcast. The controller is used to provide via the display a copy of at least a portion of the program when the period exceeds a predetermined threshold time.

17 Claims, 2 Drawing Sheets

(51) Int. Cl.
*H04N 21/431* (2011.01)
*H04N 21/433* (2011.01)
*H04N 21/472* (2011.01)
*H04N 21/84* (2011.01)
*H04N 5/76* (2006.01)
*H04N 21/2543* (2011.01)
*H04N 21/658* (2011.01)
*H04N 21/437* (2011.01)
*H04N 21/8549* (2011.01)
*H04N 5/781* (2006.01)
*H04N 5/775* (2006.01)
*H04N 5/907* (2006.01)
*H04N 5/765* (2006.01)

(52) U.S. Cl.
CPC ....... *H04N 21/2543* (2013.01); *H04N 21/437* (2013.01); *H04N 21/4316* (2013.01); *H04N 21/4331* (2013.01); *H04N 21/47202* (2013.01); *H04N 21/6581* (2013.01); *H04N 21/84* (2013.01); *H04N 21/8549* (2013.01); *H04N 5/765* (2013.01); *H04N 5/775* (2013.01); *H04N 5/781* (2013.01); *H04N 5/907* (2013.01)

(58) Field of Classification Search
CPC ........... H04N 21/2543; H04N 21/4316; H04N 21/4331; H04N 21/437; H04N 21/6581; H04N 21/84; H04N 21/8549; H04N 5/765; H04N 5/775; H04N 5/781; H04N 5/907
USPC ...... 725/32, 40–43, 48–61, 86–92, 100–103, 725/114–118, 135–136; 709/217–232
See application file for complete search history.

(56) References Cited

U.S. PATENT DOCUMENTS

| | | | |
|---|---|---|---|
| 5,488,611 A * | 1/1996 | Zijderhand | H04B 7/2681 370/347 |
| 5,583,937 A * | 12/1996 | Ullrich | H04N 7/17336 380/231 |
| 5,594,794 A | 1/1997 | Eyer et al. | |
| 5,604,528 A * | 2/1997 | Edwards | H04N 7/167 340/5.28 |
| 5,608,874 A | 3/1997 | Ogawa et al. | |
| 5,724,646 A * | 3/1998 | Ganek | H04N 7/17318 348/E7.071 |
| 5,729,280 A | 3/1998 | Inoue et al. | |
| 5,752,160 A * | 5/1998 | Dunn | H04N 5/44543 348/E5.105 |
| 5,875,303 A | 2/1999 | Huizer et al. | |
| 5,900,905 A | 5/1999 | Shoff et al. | |
| 5,956,321 A | 9/1999 | Yao et al. | |
| 5,974,218 A | 10/1999 | Nagasaka et al. | |
| 6,072,808 A | 6/2000 | O'Connor | |
| 6,104,705 A | 8/2000 | Ismail et al. | |
| 6,173,112 B1 | 1/2001 | Gruse et al. | |
| 6,175,386 B1 | 1/2001 | Van De Schaar-Mitrea et al. | |
| 6,181,335 B1 | 1/2001 | Hendricks et al. | |
| 6,209,130 B1 * | 3/2001 | Rector, Jr. | H04N 21/2665 725/50 |
| 6,219,837 B1 * | 4/2001 | Yeo et al. | 725/38 |
| 6,310,866 B1 * | 10/2001 | Kronestedt | H04W 16/14 370/330 |
| 6,336,143 B1 * | 1/2002 | Diedrich | G06F 13/372 709/219 |
| 6,392,664 B1 | 5/2002 | White et al. | |
| 6,430,591 B1 | 8/2002 | Goddard | 718/102 |
| 6,463,508 B1 * | 10/2002 | Wolf | G06F 12/0888 711/130 |
| 6,473,414 B1 * | 10/2002 | Hartley | H04W 74/0808 370/338 |
| 6,526,577 B1 * | 2/2003 | Knudson | H04N 5/44543 348/E5.104 |
| 6,530,084 B1 | 3/2003 | Del Sesto et al. | |
| 6,543,053 B1 | 4/2003 | Li et al. | |
| 6,563,515 B1 | 5/2003 | Reynolds et al. | |
| 6,584,153 B1 | 6/2003 | Gordon et al. | |
| 6,598,228 B2 * | 7/2003 | Hejna, Jr. | 725/91 |
| 6,609,253 B1 | 8/2003 | Swix et al. | |
| 6,622,305 B1 | 9/2003 | Willard | |
| 6,636,271 B1 | 10/2003 | Megeid | |
| 6,636,888 B1 * | 10/2003 | Bookspan | G06Q 10/109 709/200 |
| 6,658,019 B1 | 12/2003 | Chen et al. | |
| 6,678,463 B1 | 1/2004 | Pierre et al. | |
| 6,678,855 B1 | 1/2004 | Gemmell | |
| 6,711,741 B2 | 3/2004 | Yeo | |
| 6,748,441 B1 * | 6/2004 | Gemmell | H04L 1/0041 709/231 |
| 6,761,528 B2 | 7/2004 | Woditschka | |
| 6,829,781 B1 | 12/2004 | Bhagavath et al. | |
| 6,832,386 B1 | 12/2004 | Jerding et al. | |
| 6,868,551 B1 | 3/2005 | Lawler et al. | |
| 6,925,180 B2 * | 8/2005 | Iwamura | 380/37 |
| 6,973,662 B1 * | 12/2005 | Sie | H04N 21/2393 348/E7.071 |
| 7,127,735 B1 | 10/2006 | Lee et al. | |
| 7,143,431 B1 | 11/2006 | Eager et al. | |
| 7,178,106 B2 | 2/2007 | Lamkin et al. | |
| 7,228,559 B1 * | 6/2007 | Sie | H04N 7/17318 348/E7.071 |
| 7,240,359 B1 * | 7/2007 | Sie | H04N 7/17318 348/E7.071 |
| 7,330,875 B1 * | 2/2008 | Parasnis | G06Q 10/10 709/203 |
| 7,343,614 B1 | 3/2008 | Hendricks et al. | |
| 7,406,655 B2 * | 7/2008 | Jun | G06F 17/30044 348/E7.061 |
| 7,694,320 B1 | 4/2010 | Yeo et al. | |
| 7,747,982 B1 * | 6/2010 | Sie | H04N 21/4334 725/87 |
| 7,788,339 B1 * | 8/2010 | Srinivasan | 709/219 |
| 7,971,227 B1 | 6/2011 | Marko et al. | |
| 8,769,593 B1 | 7/2014 | Schwartz et al. | |
| 2001/0043618 A1 * | 11/2001 | Chien | H04W 74/004 370/498 |
| 2002/0013948 A1 * | 1/2002 | Aguayo, Jr. | H04N 21/43615 348/E7.071 |
| 2002/0042914 A1 | 4/2002 | Walker et al. | |
| 2002/0059623 A1 * | 5/2002 | Rodriguez | H04N 5/44543 725/91 |
| 2002/0069420 A1 * | 6/2002 | Russell et al. | 725/92 |
| 2002/0075318 A1 | 6/2002 | Yang et al. | |
| 2002/0095510 A1 * | 7/2002 | Sie | H04N 21/8456 709/231 |
| 2002/0118952 A1 * | 8/2002 | Nakajima | H04N 5/9205 386/239 |
| 2002/0124258 A1 * | 9/2002 | Fritsch | H04N 7/17336 725/88 |
| 2002/0124259 A1 * | 9/2002 | Chang | H04N 7/17318 725/91 |
| 2002/0129159 A1 | 9/2002 | Luby et al. | |
| 2002/0129362 A1 | 9/2002 | Shang et al. | |
| 2002/0157103 A1 | 10/2002 | Song et al. | |
| 2002/0170068 A1 | 11/2002 | Rafey et al. | |
| 2002/0194598 A1 * | 12/2002 | Connelly | H04H 60/06 725/39 |
| 2002/0196367 A1 | 12/2002 | Yui et al. | |
| 2003/0014758 A1 | 1/2003 | Kim | |
| 2003/0021228 A1 * | 1/2003 | Nakano | G06F 9/4887 370/229 |
| 2003/0035343 A1 * | 2/2003 | Paritsky | H04R 23/008 367/140 |
| 2003/0037068 A1 | 2/2003 | Thomas et al. | |
| 2003/0037331 A1 * | 2/2003 | Lee | H04N 7/17336 725/32 |
| 2003/0046695 A1 * | 3/2003 | Billmaier | G06F 3/0482 725/39 |

(56) References Cited

U.S. PATENT DOCUMENTS

| | | | |
|---|---|---|---|
| 2003/0083095 A1* | 5/2003 | Liang | H04W 72/1215 455/552.1 |
| 2003/0093803 A1* | 5/2003 | Ishikawa et al. | 725/94 |
| 2003/0101460 A1* | 5/2003 | Liu | H04N 7/173 18 725/95 |
| 2003/0115597 A1* | 6/2003 | Yassin | H04N 21/44055 725/36 |
| 2003/0161611 A1 | 8/2003 | Okada | |
| 2004/0031047 A1* | 2/2004 | Legallais | H04N 5/44543 725/25 |
| 2004/0117841 A1 | 6/2004 | Urakoshi | |
| 2004/0133907 A1* | 7/2004 | Rodriguez | H04H 20/10 725/14 |
| 2004/0221055 A1* | 11/2004 | Liebenow | H04N 7/173 18 709/231 |
| 2004/0226042 A1* | 11/2004 | Ellis | H04N 5/44543 725/43 |
| 2004/0255334 A1* | 12/2004 | Logan | G11B 20/10527 725/134 |
| 2004/0255336 A1 | 12/2004 | Logan et al. | |
| 2004/0255340 A1* | 12/2004 | Logan | G11B 27/105 725/145 |
| 2005/0042983 A1 | 2/2005 | Borgward | |
| 2005/0235319 A1 | 10/2005 | Carpenter et al. | |
| 2005/0240961 A1 | 10/2005 | Jerding et al. | |
| 2005/0251827 A1 | 11/2005 | Ellis et al. | |
| 2008/0072260 A1 | 3/2008 | Rosin et al. | |
| 2011/0093898 A1* | 4/2011 | Rosenthol | H04N 21/4314 725/46 |
| 2011/0173653 A1 | 7/2011 | Arsenault et al. | |

FOREIGN PATENT DOCUMENTS

| | | |
|---|---|---|
| EP | 03739716 | 2/2003 |
| EP | 03739716.3 | 2/2003 |
| JP | 11177962 | 7/1999 |
| JP | 2000339857 | 12/2000 |
| JP | 2001156664 | 6/2001 |
| JP | 2003-568885 | 8/2004 |
| JP | 2009-042774 | 2/2009 |
| WO | 00/04706 | 1/2000 |
| WO | 00/64153 | 10/2000 |
| WO | 01/60057 | 8/2001 |
| WO | 0174076 A1 | 10/2001 |
| WO | 0176249 | 10/2001 |

OTHER PUBLICATIONS

Japanese Patent Application No. 2009-042774 Office Action dated Sep. 6, 2010.
Japanese Patent Application No. 2003-568885 Office Action dated Oct. 16, 2008.
Sci-Fi Channel to Launch New On-Screen Identifiers For Pulp Sci-Fi and Altered States Program Blocks, Design Week, 2000.
Geocast Network Systems is Developing a System Combining On-Demand Datacasting With Real-Time Digital TV Programming and Will Begin Test Marketing in 3/00 and 7/00, Communications International, 1999.
TV Guide Inc To Offer Ultimate Cable Magazine For Consumers; Also to Improve Electronic Program Guides, Multichannel News, 1999.
Revenues For Interactive Multimedia Services to The Home in Western Europe, The U.S. and Asia Pacific Will Grow From $2,220 Million in 1996 to $73,257 Million in 2006, Advanced Television Markets, 1997.
Cable Operators, Set top Decoder Suppliers Explore Strategy to Use New-Generation Analog Set-Top Boxes to Deliver Limited Interactive TV Capabilities Via Vertical Blanking Interval; Scientific-Atlanta Analysis Reviewed, Television Business International, 1996.
CableSoft Corp. Developing Low-Cost Interactive TV That Uses Standard Set-Top Boxes; Available 3/96, Boston Globe (MA)' 1996.
Time Warner Tests its New Interactive Television Network Orlando, FL, New York Times (National Edition), 1994.
Hughes Networks On The Final Frontier. (The DirecPC Satellite Information Service) (Company Business and Marketing), PC Magazine, 1996.
Du Jianghong, Scheduling Algorithm For MPEG-2 TS Multiplexers in CATV Networks, IEEE Transactions on Broadcasting, vol. 46, Part 4, pp. 249-255, Dec. 2000.
Glidewell, Dick, Cost-Effective Real Time Data Handling, Wall Street & Technology Product Digest Supplement, pp. 36-38, Jul. 1997.
Manes, Stephen, News At 11:10: TV Watches Mani, Forbes, vol. 163, No. 9, pp. 204-206, 99/05/03.
Costello, Marjorie, VideoGuide vs. StarSight—Going Screen-To-Screen, Dealerscope Consumer Electronics Marketplace, vol. 38, No. 1, pp. 32-34+, 96/01/00.
O'Shea, Dan, Industry Fast-Forwards to Western Show, Telephony, vol. 229, No. 22, pp. 8-9, 95/11/27.
Du Jianghong, A Study of Scheduling Algorithm For MPEG-2 TS Multiplexers in CATV Networks, Chinese Journal of Electronics, vol. 10, Part 3' pp. 376-381, Jul. 2001.
Trail, J., Advanced Optical and Digital Architectures For Video-On-Demand, CTE—The Cable Communications Quarterly, vol. 22, Part 2, pp. 18-22, Jun. 2000.
Response to Canadian Office Action—CA Application 2,472,921—dated Mar. 11, 2015.
Canadian Office Action—CA Application 2,472,921—dated Oct. 20, 2015.
Canadian Office Action—CA App. 2,472,921—dated Oct. 13, 2016.
Apr. 24, 2019—Canadian Office Action—2,472,921.
Apr. 14, 2020—Canadian Office Action—CA 2,472,921.

* cited by examiner

① SYSTEM DETERMINES WHETHER OR NOT TO DOWNLOAD DATA BASED ON HOW LONG THEY PAUSE ON A CHANNEL

② NOTIFICATION MIGHT BE VIA TRANSLUCENT TEST OR VIA GRAPHICAL ICON

③ USERS MIGHT ELECT TO AUTOMATICALLY RETRIEVE CONTENT OF INTEREST OR TO BE MANUALLY PROMPTED BEFORE DOWNLOADING

④ THE SYSTEM WILL ONLY SUPPORT A PRE-DETERMINED NUMBER OF SYSTEMS TO EACH USER

⑤ WITH PERCENT BILLING, CUSTOMERS RECEIVE A CHARGE EACH TIME THEY VIEW DOWNLOADED CONTENT. FLAT RATE CUSTOMERS CAN DOWNLOAD FOR A FIXED MONTHLY FEE

SYSTEM AND METHOD FOR PROVIDING VIDEO PROGRAM INFORMATION OR VIDEO PROGRAM CONTENT TO A USER

RELATED APPLICATION

This application is a continuation of U.S. patent application Ser. No. 10/074,743 filed Feb. 12, 2002. The disclosure of the priority application is hereby incorporated by reference in its entirety.

BACKGROUND OF THE INVENTION

1. Field of the Invention

The present invention relates to a system and method for providing video program information or video program content to a user.

2. Background

Cable and satellite television service providers now offer subscribers hundreds of channels, each broadcasting a wide variety of video programs, thereby presenting subscribers with hundreds of programming choices at any given time of day. As a result, a subscriber is often forced to switch between television programs of interest, or to finish watching one program before the subscriber can begin watching another program, the broadcast of which has already started.

Moreover, the onset of television viewing by a subscriber is often asynchronous with respect to program broadcast schedules. Still further, television programs may not fit into standard one-half or one hour time slots, or the time then available to a subscriber for viewing. Thus, inevitably, some program of interest to a subscriber will be in-progress, no matter when the subscriber chooses to begin watching television.

For all of these reasons, subscribers to cable and/or satellite television services are often faced with decisions as to whether to begin watching a program that is already in progress. That is, for an in-progress program, no mechanism or procedure exists for a subscriber to "catch-up" on that portion of the program already broadcast. Similarly, for an in-progress program, no mechanism or procedure exists for a subscriber to obtain a copy of that portion of the program already broadcast, or a complete copy of the program, either automatically or upon a request by the subscriber.

In that regard, on-screen television program guides are known which afford the display of television program information, which may include program start and end times, as well as a brief, and often cryptic, description of the program. However, such program guides neither deliver nor support the delivery of "catch-up" information tailored for an individual viewer and a given program based on the time that the viewer begins watching the program.

Still further, in addition to well known video cassette recording (VCR) systems, which can be programmed in advance of the broadcast time of a television program to automatically record the program at the broadcast time, digital video recording (DVR) systems are known that can also record television programs, either as scheduled events or on a speculative basis based on pre-determined user preferences provided to the DVR system by the user. In that regard, current DVR systems also allow a user to go back to any point in the locally stored video content, up to the existing storage capacity of the DVR system.

Such existing VCR and DVR systems, however, do not allow a user to obtain that portion of an in-progress program already broadcast (including from the beginning of the program), or a complete copy of the in-progress program if the user was not previously tuned to the particular channel on which the program is broadcast. In addition, although streaming video methods exist that allow a user to download digital video, such methods do not work seamlessly and/or dynamically with passive television viewing. That is, such methods again do not allow a user to automatically obtain that portion of an in-progress television program already broadcast (including from the beginning of the program), or a complete copy of the in-progress program.

Thus, there exists a need for a system and method that would, in a system for broadcasting video programs, allow a user to "catch-up" on a program already in progress. Such a system and method would allow a user, such as a cable or satellite service subscriber, to initiate a request for and receive a timely synopsis or summary of major events, actions, outcomes, or other information pertaining to a program, the broadcast of which is already in progress.

In addition, there exists a need for a system and method that would allow such a user, either automatically or upon request, to obtain a copy of at least a portion of a program, the broadcast of which is already in progress. Such a system and method would allow a user to dynamically retrieve, store and manage the video content of such programs. Such systems and methods would thereby enhance the value of video programming by making such programming more comprehensible, interesting, and entertaining to viewers. In such a fashion, such systems and methods would increase the likelihood that such programming will be watched by more viewers, which is an important goal of program content providers, cable and/or satellite television service providers, and advertisers.

SUMMARY OF THE INVENTION

Accordingly, the present invention provides, in a system for broadcasting video programs to a user including a display, a system and method for providing program information or a copy of at least a portion of a program to the user.

According to the present invention, then, in a system for broadcasting video programs to a user including a display, a system is provided for providing program information to the user. The system comprises an input device for use in generating an input signal representing a request for summary information concerning a video program, the program having a beginning and the input signal being generated at a time during a broadcast of the program. The system further comprises a controller for receiving the input signal and, in response thereto, providing via the display a summary of the program from the program beginning to the input signal time.

Also according to the present invention, in a system for broadcasting video programs to a user including a display, a method is provided for providing program information to the user. The method comprises providing a controller for receiving an input signal representing a request for summary information concerning a video program, the program having a beginning and the input signal being generated at a time during a broadcast of the program, and for providing via the display a summary of the program from the program beginning to the input signal time in response to receipt of the input signal.

Still further according to the present invention, in a system for broadcasting video programs to a user including a display, a system is provided for providing a copy of at least a portion of the program to the user. The system comprises a controller for monitoring a period of time during which the display is tuned to a broadcast of a video program, the period starting during the broadcast of the program, and for use in providing via the display a copy of at least a portion of the program when the period exceeds a predetermined threshold time. The system further comprises a storage medium for use in storing the copy of at least a portion of the program.

Further still according to the present invention, in a system for broadcasting video programs to a user including a display, a method is provided for providing a copy of at least a portion of the program to the user. The method comprises providing a controller for monitoring a period of time during which the display is tuned to a broadcast of a video program, the period starting during the broadcast of the program, and for use in providing via the display a copy of at least a portion of the program when the period exceeds a predetermined threshold time.

The preferred embodiments of the present invention are set forth in the following detailed descriptions thereof, including the accompanying drawings.

DETAILED DESCRIPTION OF THE PREFERRED EMBODIMENT(S)

Referring now to the Figures, the preferred embodiments of the present invention will now be described in detail. As previously noted, cable and satellite television service providers now offer subscribers hundreds of channels, each broadcasting a wide variety of video programs. As a result, a subscriber is often forced to switch between television programs of interest, or to finish watching one program before the subscriber can begin watching another program, the broadcast of which has already started.

Moreover, the onset of television viewing by a subscriber is often asynchronous with respect to program broadcast schedules. Still further, television programs may not fit into standard one-half or one hour time slots, or the time then available to a subscriber for viewing. For all of these reasons, subscribers to cable and/or satellite television services are often faced with decisions as to whether to begin watching a program that is already in progress. That is, for an in-progress program, no mechanism or procedure exists for a subscriber to "catch-up" on that portion of the program already broadcast. Similarly, for an in-progress program, no mechanism or procedure exists for a subscriber to obtain a copy of that portion of the program already broadcast, or a complete copy of the program, either automatically or upon a request by the subscriber.

In that regard, as also described previously, on-screen television program guides are known which afford the display of television program information, which may include program start and end times, as well as a brief, and often cryptic, description of the program. However, such program guides neither deliver nor support the delivery of "catch-up" information tailored for an individual viewer and a given program based on the time that the viewer begins watching the program.

Still further, in addition to well known video cassette recording (VCR) systems, which can be programmed in advance of the broadcast time of a television program to automatically record the program at the broadcast time, digital video recording (DVR) systems are known that can also record television programs, either as scheduled events or on a speculative basis based on pre-determined user preferences provided to the DVR system by the user. In that regard, current DVR systems also allow a user to go back to any point in the locally stored video content, up to the existing storage capacity of the DVR system.

Such existing VCR and DVR systems, however, do not allow a user to obtain that portion of an in-progress program already broadcast (including from the beginning of the program), or a complete copy of the in-progress program if the user was not previously tuned to the particular channel on which the program is broadcast. In addition, although streaming video methods exist that allow a user to download digital video, such methods do not work seamlessly and/or dynamically with passive television viewing. That is, such methods again do not allow a user to automatically obtain that portion of an in-progress television program already broadcast (including from the beginning of the program), or a complete copy of the in-progress program.

Thus, there exists a need for a system and method that would, in a system for broadcasting video programs, allow a user to "catch-up" on a program already in progress. Such system and method would allow a user, such as a cable or satellite service subscriber, to initiate a request for and receive a timely synopsis or summary of major events, actions, outcomes, or other information pertaining to a program, the broadcast of which is already in progress.

In addition, there exists a need for a system and method that would allow such a user, either automatically or upon request, to obtain a copy of at least a portion of a program, the broadcast of which is already in progress. Such a system and method would allow a user to dynamically retrieve, store and manage the video content of such programs. Such systems and methods would enhance the value of video programming by making such programming more comprehensible, interesting, and entertaining to viewers, thereby increasing the likelihood that such programming will be watched by more viewers, which is an important goal of program content providers, cable and/or satellite television service providers, and advertisers.

In one embodiment, the present invention enables a television viewer to "catch-up" on a program, the broadcast of which is already in progress. Using standard television input devices and methods, such as a wireless television remote control, a wireless keyboard, an onscreen guide, or any combination thereof, a viewer initiates a request for a timely synopsis or summary of major events, actions, outcomes and/or other information pertaining to that portion of the in-progress program already broadcast.

Such summary information may take any of a number of forms. For example, such summary information may be video content comprising text, which is simple and easily manipulated. Alternatively, IP streaming media, which may comprise audio and/or video content, such as video clips, may be provided using the full display, an overlay, a separate channel, or a separate window on the television display, such as via picture-in-picture functionality. "Catch-up" information is preferably provided by the content providers of the television programs.

More particularly, an exemplary sequence of events to deliver a web-based text synopsis includes a viewer selecting a "catch-up" capability via a television wireless remote control, wireless keyboard and/or an onscreen guide. A television set-top box then requests a URL for dynamically generated video content comprising text. A server for the program content provider receives the request and delivers one of several possible summaries based on a clock time indicative of that portion of the in-progress program already broadcast. Thereafter, the set-top box delivers the summary to the viewer via the television display. Another possible alternative is the use of Advanced Television Enhancement Form (ATVEF) transport B to send text summaries embedded in the video stream of the program. In this embodiment, the set-top box stores the most current summary, and delivers that summary to the viewer via the display at the viewer's request.

Figure 1:
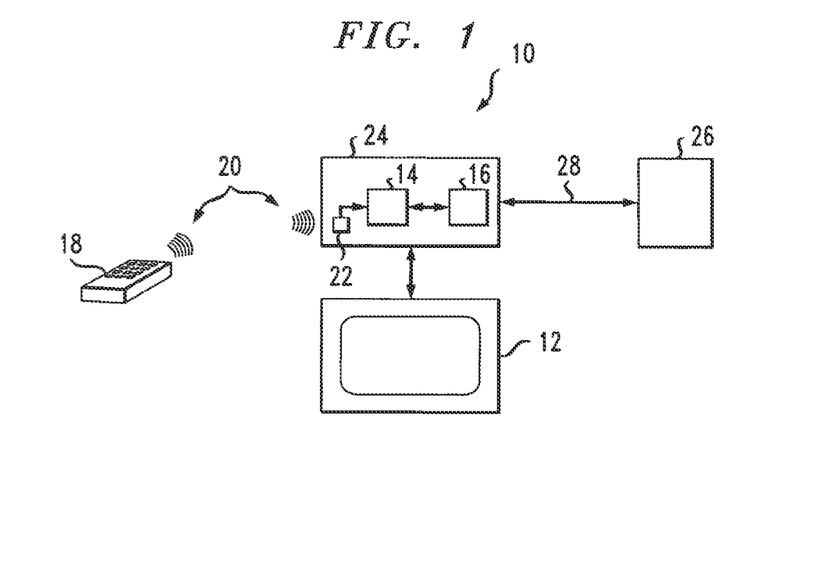
FIG. 1 is a simplified, exemplary block diagram of the system of the present invention.

Referring now to FIG. 1, a simplified, exemplary block diagram including the system of the present invention is shown, denoted generally by reference numeral 10. As seen therein, a display (12) is provided in communication with a controller (14). Display (12) is preferably a television for use by a cable or satellite television service subscriber (not shown), although the present invention is suitable for use with other types of display devices, such as a computer. Controller (14) is itself provided in communication with a storage medium (16). In that regard, storage medium (16) is preferably RAM, although any other type of storage medium, such as a magnetic disk, could also be used.

A cable or satellite television service subscriber (who may also be referred to as a user or viewer) interfaces with controller (14) via an input device (18). In that regard, while input device (18) preferably comprises a wireless remote control device, any type of input device known to those of ordinary skill in the art could also be used, such as a wireless keyboard. Input device (18) is for use by a viewer (not shown) to generate input signals (20) for use in controlling display (12) or for use in the present invention. As seen in FIG. 1, controller (14) receives input signal (20) from input device (18) via a conventional receiver (22) configured for use with input device (18). Controller (14), storage medium (16) and receiver (22) preferably form at least part of a television set-top box (24).

As part of set-top box (24), controller (14) is provided in communication with at least one remote site (26) via at least one communication path (28). In that regard, the remote site or sites (28) may be associated with a cable or satellite television service provider and/or a program content provider, and may include a server, data storage devices and/or other equipment. In that same regard, the communication path or paths (28) preferably provide for two-way communication between set-top box (24) and remote site (26), and may comprise any type of path suitable for such communication, such as a cable line, DSL, telephone line, satellite link, wireless link, or any other well known communication path. Still further, communication path or paths (28) may also comprise any hardware or devices necessary for providing such communication, such as a modem or a satellite dish receiver.

As can be seen from FIG. 1, display (12), input device (18), set-top box (24), remote site (26), and communication path (28) are part of a system for broadcasting video programs, such as for viewing by a satellite or cable television subscriber. Thus, in a system for broadcasting video programs to a user including a display (12), the present invention provides a system for providing program information to the user. In that regard, input device (18) is for use in generating an input signal (20) representing a request for summary information concerning a video program, the program having a beginning and the input signal being generated at a time during a broadcast of the program. Controller (14) is for receiving the input signal (20) and, in response thereto, providing via the display (12) a summary of the program from the program beginning to the input signal time.

In that regard, controller (14) is preferably further for transmitting a control signal to remote site (26) in response to receipt of the input signal (20), and for receiving the summary in response to transmission of the control signal. Controller (14) may be operative to receive the summary from the remote site (26), or from a site other than the remote site (26).

As previously described, the summary may comprises video content, audio content, or both. In that regard, the video content may comprise text, and such text may be embedded in the program, to be provided by the controller (14) via the display (12) only afer receipt of the input signal (20) by the controller (14). Further, the video content may be provided on a portion of the display (12) separate from a portion of the display (12) used to provide the program.

In another embodiment, the present invention provides a system and method for requesting and storing the un-viewed portion of a video broadcast already in progress. This embodiment preferably involves the use of a set-top box (24) with Digital Video Recording (DVR) functionality, a head-end architecture that supports server based storage of the broadcast video content, and a two-way broadband data network. According to this embodiment of the present invention, a viewer is able to initiate network retrieval of a previously broadcast video program based on the viewer's activity as the viewer alternates between programs on different channels (i.e., channel "surfs").

For example, referring still to FIG. 1, after channel surfing among a variety of channels, a viewer tunes display (12) to a particular television program which is in progress, and then watches the program for a pre-determined period of time. The set-top-box (24) then automatically contacts a video storage device at the head-end, such as may be provided at remote site (26), that has been storing the broadcast video, and begins to download the program from the beginning using the Data-Over-Cable Service Interface Specification (DOCSIS) channel, or any other out-of-band (OOB) data channel, such as may be provided by communication path (28).

In addition to requesting and storing the previously broadcast video using an OOB channel, the set-top-box (24) also preferably stores the broadcast video from the moment the user first tuned display (12) to the program, and continues to store the content as it is broadcast in real time. The OOB download preferably occurs at the maximum download speed available on the network, with the download starting at the beginning of the program, continuing until the initial storage of the program and, if content is available on the server, continuing to download the program from the end of the program.

According to this embodiment of the present invention, the user's channel tune event automatically initiates the local storage of the program content. In that regard, for example, local storage may be delayed for a predetermined amount of time to ensure that the viewer is actually tuned to and watching a particular program, rather than channel surfing. The present invention further provides for managing the download process as a user watches a program or moves through the locally stored content. In that regard, for example, if a user elects to move quickly to the beginning of locally stored content, the content already viewed is preferably kept, the content currently being watched is preferably cached locally, such as in storage medium (16), and those portions of content not yet cached may be requested in a specific order. Still further, the present invention also provides for network content requests, storage management and storage clean-up as the user changes channels. In that regard, for example, the user is preferably prompted by set-top-box (14) via display (12) as to whether or not to continue downloading program content if the user changes channels during the download process.

In such fashion, the present invention allows a user to watch an entire program that the user previously would have missed by tuning in to the program after its broadcast has already started. As a result, a user will have access to the beginning of a program, or the entire program, by the mere act of tuning in and watching a portion of the program.

According to this embodiment, and referring still to FIG. 1, in a system for broadcasting video programs to a user including a display (12), the present invention provides a system for providing a copy of at least a portion of the program to the user. Controller (14) is for monitoring a period of time during which the display (12) is tuned to a broadcast of a video program, the period starting during the broadcast of the program, and for use in providing via the display (12) a copy of at least a portion of the program when the period exceeds a predetermined threshold time. Storage medium (16) is for use in storing the copy of at least a portion of the program.

In this embodiment, controller (14) is preferably further for communicating with remote site (26) to request a copy of at least a portion of the program when the period exceeds the predetermined threshold time, and for receiving the copy of at least a portion of the program. In that regard, controller (14) may be operative to receive the copy of at least the portion of the program from remote site (26), or from a site other than remote site (26). As previously described, the copy of at least a portion of the program preferably comprises a complete copy of the program.

Also in this embodiment, input device (18) may be provided for use in generating a request for display of, and the controller (14) is further for providing via the display (12), at least a portion of the copy of at least a portion of the program during the broadcast of the program. Still further, as also described previously, controller (14) may also be for requesting, and input device (18) for use in generating, an indication whether to continue receiving the copy of at least a portion of the program when the display (12) is tuned to a broadcast of another video program before receipt of the copy of at least a portion of the program has been completed.

Alternatively in this embodiment, controller (14) may be provided for requesting, and input device (18) may be for use in generating, an indication whether a copy of at least a portion of the program is desired when the period exceeds a predetermined threshold time. In that regard, controller (14) may be provided for communicating with remote site (26) to request a copy of at least a portion of the program upon a receipt of an indication that a copy of at least a portion of the program is desired.

Figure 2:
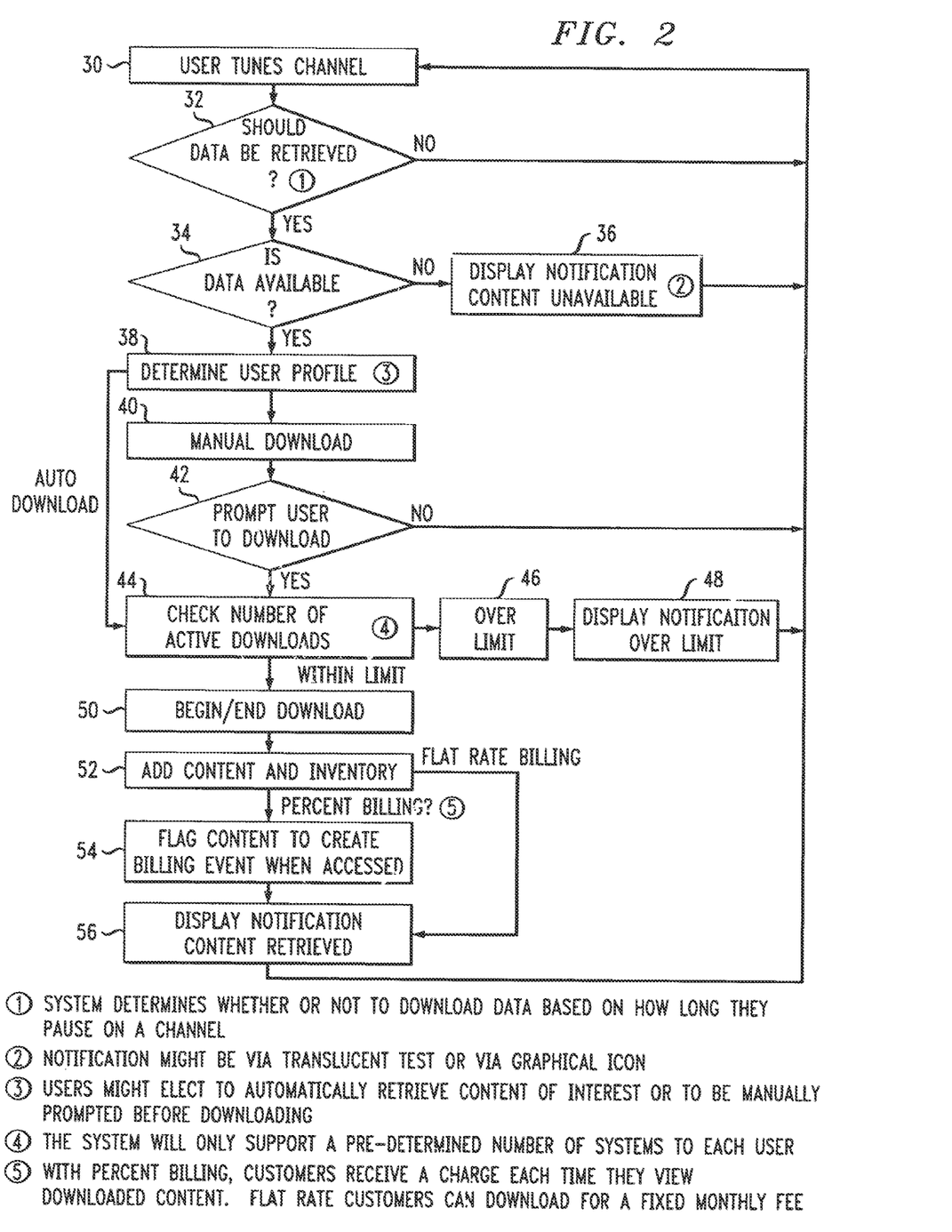
FIG. 2 is a simplified, exemplary flowchart concerning the present invention.

Referring next to FIG. 2, a simplified, exemplary flowchart concerning this embodiment of the present invention is shown. As seen therein, after a user tunes to a particular channel at (30), the present invention then determines at (32) whether or not to download data based on how long the user pauses on that channel. If it is determined at (32) that the user did not pause for a sufficient time on that channel, the present invention again determines at (32) whether or not to download data based on how long the user pauses on a subsequent channel.

If it is determined at (32) that data is to be downloaded, it is then determined at (34) if the data is available. If not, the user is notified at (36), such as via translucent text or a graphical icon on the display, that the desired content is unavailable. If the data is available, a user profile is determined at (38). In that regard, a user might have previously elected to automatically retrieve content of interest or, alternatively, to be manually prompted before downloading.

If the user profile indicates manual download is desired at (40), then the present invention prompts the user as to whether a download is desired at (42). If not, no further action is undertaken. Alternatively, if the user indicates that a download is desired, or if the user profile indicates automatic download is desired, the number of active downloads by the user is checked at (44). In that regard, the present invention preferably supports only a pre-determined number of data streams to each user. If the user is over such a pre-determined limit at (46), the user is notified at (48), again such as via translucent text or a graphical icon on the display, that such a pre-determined limit has been exceeded.

Figure 3:
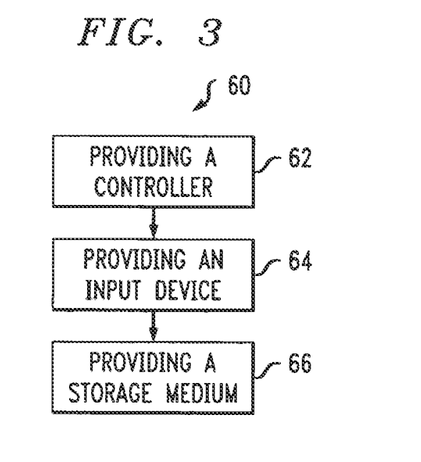
FIG. 3 is a simplified, exemplary flowchart of one embodiment of the method of the present invention.

Alternatively, if the user is within such a pre-determined limit, the download process is undertaken at (50), and the content is added to the user's inventory at (52). As seen in FIG. 3, a user may be charged for such a service, and billing for such a charge may be on a flat rate or per event basis. With a flat rate charge, a user may download for a fixed monthly, or other periodic, fee. With a per event charge, a user receives a charge each time downloaded content is viewed. For a per event charge, downloaded content is flagged to create a billing event at (54) when the downloaded content is viewed. For either type of billing basis, the user is notified at (56), again such as via translucent text or a graphical icon on the display, that the downloaded content has been retrieved and is available for viewing.

Referring next to FIG. 3, a simplified, exemplary flowchart of one embodiment of the method of the present invention is shown, denoted generally by reference numeral 60. The method (60) is for use in a system for broadcasting video programs to a user including a display, and is for providing program information to the user. As seen in FIG. 3, the method (60) comprises providing (62) a controller for receiving an input signal representing a request for summary information concerning a video program, the program having a beginning and the input signal being generated at a time during a broadcast of the program, and for providing via the display a summary of the program from the program beginning to the input signal time in response to receipt of the input signal. The method (60) may further comprise providing (64) an input device for use in generating the input signal.

As previously described, the controller may further be for transmitting a control signal to a remote site in response to receipt of the input signal, and for receiving the summary in response to transmission of the control signal. In that regard, the controller may be operative to receive the summary from the remote site, or from another site. As also previously described, the summary may comprise video content, audio content, or both. In that regard, the video content may comprise text, and may be provided on a portion of the display separate from a portion of the display used to provide the program. Still further, the summary may comprise text embedded in the program, the text to be provided by the controller via the display only after receipt of the input signal by the controller. The method (60) may also further comprise providing (66) a storage medium for use in storing the summary.

Figure 4:
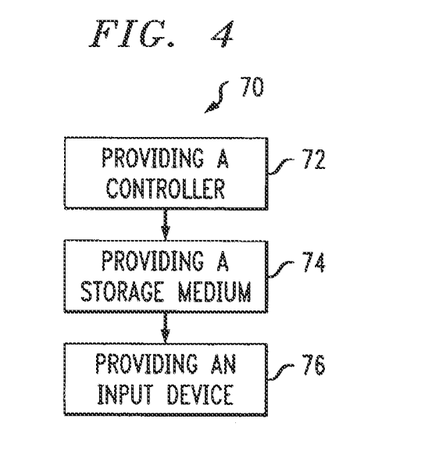
FIG. 4 is a simplified, exemplary flowchart of another embodiment of the method of the present invention.

Referring now to FIG. 4 a simplified, exemplary flowchart of another embodiment of the method of the present invention is shown, denoted generally by reference numeral 70. The method (70) is for use in a system for broadcasting video programs to a user including a display, and is for providing a copy of at least a portion of the program to the user. As seen in FIG. 3, the method (70) comprises providing (72) a controller for monitoring a period of time during which the display is tuned to a broadcast of a video program, the period starting during the broadcast of the program, and for use in providing via the display a copy of at least a portion of the program when the period exceeds a predetermined threshold time. The method (70) may further comprise providing (74) a storage medium for use in storing the copy of at least a portion of the program.

As previously described, the controller may further be for communicating with a remote site to request a copy of at least a portion of the program when the period exceeds the predetermined threshold time, and for receiving the copy of at least a portion of the program. In that regard, the controller may be operative to receive the copy of at least the portion of the program from the remote site, or from some other site. As also previously described, the copy of at least a portion of the program may comprise a complete copy of the program.

Referring still to FIG. 4, the method (70) may further comprise providing (76) an input device, wherein the input device is for use in generating a request for display of, and the controller is further for providing via the display, at least a portion of the copy of at least a portion of the program during the broadcast of the program. The controller may further be for requesting, and the input device may be for use in generating, an indication whether to continue receiving the copy of at least a portion of the program when the display is tuned to a broadcast of another video program before receipt of the copy of at least a portion of the program has been completed.

The method (70) may also further comprise providing (76) an input device, wherein the controller is further for requesting, and the input device is for use in generating, an indication whether a copy of at least a portion of the program is desired when the period exceeds a predetermined threshold time, and the controller is further for communicating with a remote site to request a copy of at least a portion of the program upon a receipt of an indication that a copy of at least a portion of the program is desired. In that regard, as previously described, the controller may be operative to receive the copy of at least the portion of the program from the remote site, or from another site. As also previously described, the copy of at least a portion of the program may comprise a complete copy of the program.

As described previously, the input device may further be for use in generating a request for display of, and the controller may further be for providing via the display, at least a portion of the copy of at least a portion of the program during the broadcast of the program. As also described previously, the controller may further be for requesting, and the input device may further be for use in generating, an indication whether to continue receiving the copy of at least a portion of the program when the display is tuned to a broadcast of another video program before receipt of the copy of at least a portion of the program has been completed.

It should be noted that the simplified flowcharts depicted in FIGS. 3 and 4 are exemplary of the method of the present invention. In that regard, the steps of such method may be executed in sequences other than those shown in FIGS. 3 and 4, including the execution of one or more steps simultaneously.

As is readily apparent from the foregoing description, the present invention provides, in a system for broadcasting video programs to a user including a display, a system and method for providing program information or a copy of at least a portion of a program to the user. The present invention provides a system and method that allow a user to "catch-up" on a program already in progress. The present invention allows a user, such as a cable or satellite service subscriber, to initiate a request for and receive a timely synopsis or summary of major events, actions, outcomes, or other information pertaining to a program, the broadcast of which is already in progress.

In addition, the present invention allows such a user, either automatically or upon request, to obtain a copy of at least a portion of a program, the broadcast of which is already in progress. The present invention allows a user to dynamically retrieve, store and manage the video content of such programs. The present invention thereby enhances the value of video programming by making such programming more comprehensible, interesting, and entertaining to viewers, thereby increasing the likelihood that such programming will be watched by more viewers, which is an important goal of program content providers, cable and/or satellite television service providers, and advertisers.

While the preferred embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
    receiving, by a user device at a request time that is after a start time of transmission of content, a first request that causes the user device to output a remaining portion of the content, wherein the remaining portion corresponds to a portion of the content beginning at the request time;
    determining, by the user device, that a time period, during which part of the remaining portion of the content has been outputted by the user device, satisfies a threshold;
    based on the first request and based on the determining that the time period satisfies the threshold, sending, by the user device and to a remote device, a second request for a beginning portion of the content, wherein the beginning portion corresponds to a portion beginning at the start time and ending at the request time; and
    receiving, from the remote device, the beginning portion of the content.

2. The method of claim 1, further comprising generating, prior to the sending the second request for the beginning portion of the content, a prompt requesting approval to generate the second request.

3. The method of claim 1, further comprising outputting the beginning portion of the content for display with at least part of the remaining portion of the content.

4. The method of claim 1, wherein the beginning portion of the content ends before the remaining portion of the content begins.

5. The method of claim 1, further comprising:
causing at least part of the remaining portion of the content to be displayed on a first portion of a display device; and
causing the beginning portion of the content to be displayed on a second portion of the display device that is different from the first portion of the display device.

6. The method of claim 1, further comprising storing, by the user device and based on the first request, at least the remaining portion of the content.

7. The method of claim 1, wherein the receiving the first request comprises receiving information indicating a selection of a channel.

8. The method of claim 1, wherein the remote device comprises a head-end device that is remote from the user device and configured to store the content during transmission of the content.

9. The method of claim 1, further comprising:
prior to the sending the second request, determining, based on a user profile that indicates that automatic retrieval of earlier portions is desired, whether to send the second request for the beginning portion of the content.

10. The method of claim 1, further comprising:
receiving, prior to completion of the receiving the beginning portion, a third request to display other content different from the content; and
based on the third request, requesting an indication of whether to continue the receiving the beginning portion.

11. The method of claim 1, wherein the determining that the time period satisfies the threshold comprises determining that the first request indicates a desire to watch the content rather than a request during channel surfing.

12. A method comprising:
receiving, by a user device at a receipt time after a start time of transmission of content, a first request that causes the user device to output a remaining portion of the content;
determining, by the user device, that a length of time, during which the remaining portion has been outputted by the user device, satisfies a threshold;
based on the determining that the length of time satisfies the threshold, sending, by the user device and to a remote device, a second request for a beginning portion of the content; and
after starting to output the remaining portion, receiving the beginning portion, wherein the beginning portion comprises a portion of the content starting at the start time and ending at the receipt time.

13. The method of claim 12, further comprising outputting, by the user device, to a display, and based on the first request, the beginning portion simultaneously with the remaining portion.

14. The method of claim 12, further comprising outputting, by the user device, the beginning portion for display over at least part of the remaining portion.

15. The method of claim 12, further comprising:
generating, prior to the sending the second request for the beginning portion, a prompt; and
outputting the prompt to request approval to generate the second request.

16. The method of claim 12, wherein the beginning portion ends before the remaining portion begins.

17. The method of claim 12, further comprising:
prior to the sending the second request, determining, based on a stored preference, to send the second request.

* * * * *

UNITED STATES PATENT AND TRADEMARK OFFICE
CERTIFICATE OF CORRECTION

| | |
|---|---|
| PATENT NO. | : 11,589,111 B2 |
| APPLICATION NO. | : 13/446479 |
| DATED | : February 21, 2023 |
| INVENTOR(S) | : Brenner et al. |

It is certified that error appears in the above-identified patent and that said Letters Patent is hereby corrected as shown below:

In the Specification

Column 5, Detailed Description of the Preferred Embodiment(s), Line 47:
Delete "(28)" and insert --(26)-- therefor Column 6, Detailed Description of the Preferred Embodiment(s), Line 20:
Delete "afer" and insert --after-- therefor Column 7, Detailed Description of the Preferred Embodiment(s), Line 10:
Delete "(14)" and insert --(24)-- therefor Signed and Sealed this
Seventh Day of May, 2024

Katherine Kelly Vidal
*Director of the United States Patent and Trademark Office*